Dec. 10, 1940. O. BONAWIT 2,224,640
VARIABLE PITCH PROPELLER
Filed April 12, 1940

Inventor
OBY BONAWIT,
By Clarence A. O'Brien
Attorney

Patented Dec. 10, 1940

2,224,640

UNITED STATES PATENT OFFICE 2,224,640

VARIABLE PITCH PROPELLER

Oby Bonawit, Manassas, Va.

Application April 12, 1940, Serial No. 329,369

2 Claims. (Cl. 170—163)

The present invention relates to new and useful improvements in variable pitch propellers for aircraft and has for one of its important objects to provide, in a manner as hereinafter set forth, a device of this character comprising a novel combination and arrangement of gears, shafts, etc., whereby the blades may be manually adjusted as desired.

Another very important object of the invention is to provide a variable pitch propeller of the character described embodying a unique construction and arrangement for retaining the blades in adjusted position.

Other objects of the invention are to provide a variable pitch propeller of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figures 1, 2, 3:
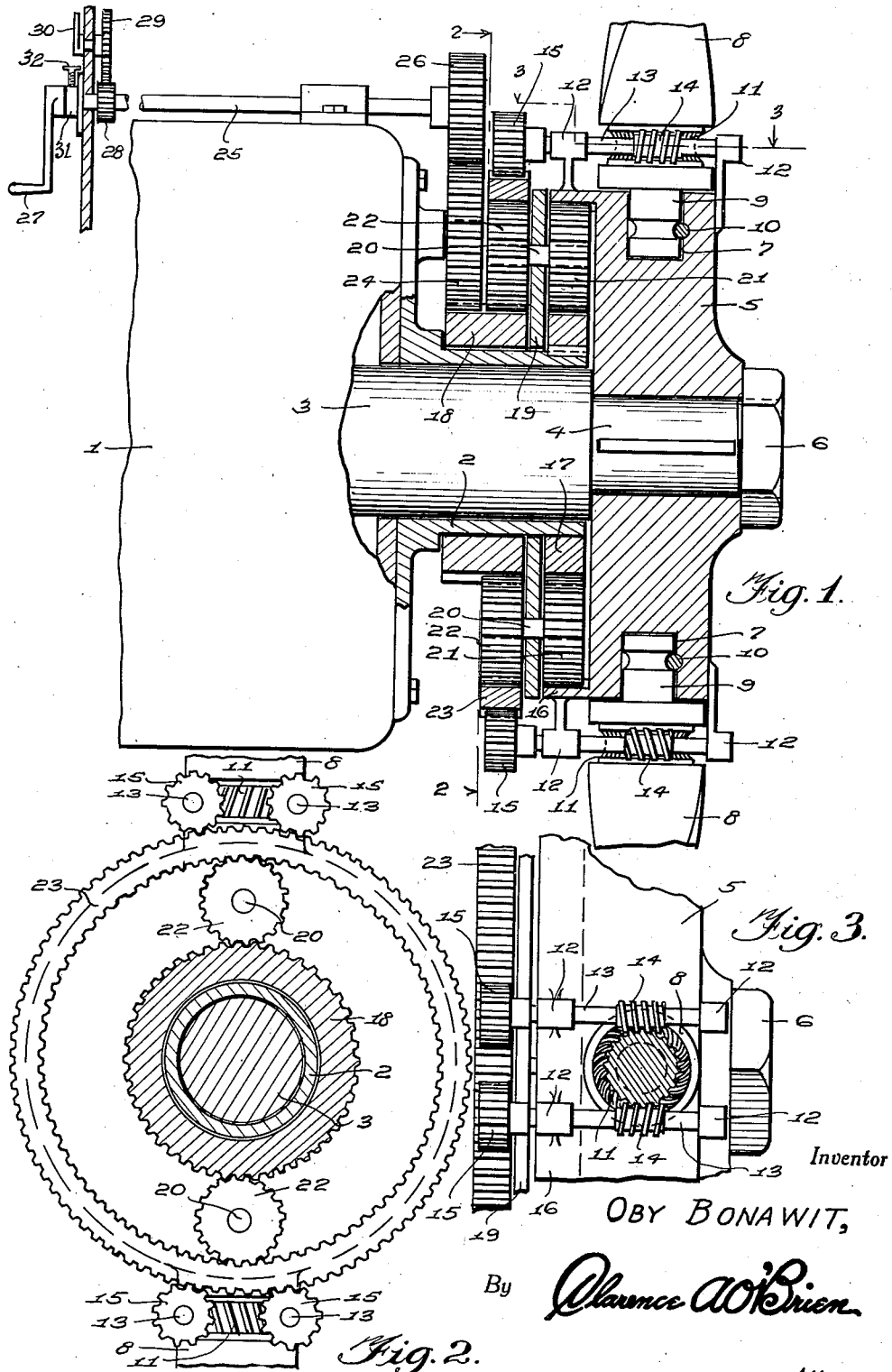
Figure 1 is a view in vertical longitudinal section through a variable pitch propeller constructed in accordance with the present invention.
Figure 2 is a cross sectional view, taken substantially on the line 2—2 of Fig. 1.
Figure 3 is a view in horizontal section, taken substantially on the line 3—3 of Fig. 1.

Referring now to the drawing in detail, it will be seen that the reference numeral 1 designates the forward end portion of the crank case of an engine. Mounted on the forward end of the crank case 1 is a tubular housing 2. Operable in the housing 2 is the crank shaft 3 of the engine which terminates in a reduced forward end portion 4. Keyed on the reduced end portion 4 of the shaft 3 is a hub 5 which is secured by a nut 6. The periphery of the hub 5 is provided with radial sockets 7. Mounted on the periphery of the hub 5 are rotatably adjustable blades 8. The blades 8 are provided with circumferentially grooved shanks 9 on their inner ends which are rotatably secured in the sockets 7 through the medium of pins or the like 10.

The inner portions of the blades 8 are provided with worm gears 11. Mounted in suitable bearings 12 on the hub 5 and extending adjacent diametrically opposite sides of the gears 11 are shafts 13. Worm gears 14 on the shafts 13 are engaged with diametrically opposite sides of the gears 11. Fixed on the rear end portions of the shafts 13 are pinion gears 15 the purpose of which will be presently set forth.

Projecting rearwardly from the hub 5 and formed integrally therewith is an internal annular gear 16 which encircles the forward end portion of the tubular housing 2. Keyed on the forward end portion of the tubular housing 2 is a stationary gear 17. The reference numeral 18 designates a double gear which is rotatably mounted on the tubular housing 2 in rearwardly spaced relation from the gear 17. Then, a plate 19 is rotatably mounted on the tubular housing 2 between the gears 17 and 18.

Secured in any suitable manner in the plate 19 are stationary stub shafts 20. Rotatably mounted on the shafts 20 on opposite sides of the plate 19 are gears 21 and 22. The gears 21 are in constant mesh with the gears 16 and 17 and are adapted to roll or travel around the latter.

The gears 22 are in mesh with the forward end portion of the double gear 18. An internally and externally toothed annular gear 23 is provided for operatively connecting the gears 15 and 22. A gear 24, which is rotatably mounted on the forward end of the crank case 1, meshes with the rear end portion of the double gear 18. The reference numeral 25 designates a manually actuated shaft having a gear 26 on its forward end portion meshed with the gear 24. On the rear end portion of the shaft 25 is an operating crank 27. Also mounted on the shaft 25 is a gear 28 which drives a gear 29 for actuating a blade position indicator 30.

It is thought that the operation of the propeller will be readily apparent from a consideration of the foregoing. Briefly, to adjust the blades 8, the shaft 25 is rotated through the medium of the crank 27 thereby rotating the double gear 18 through the gears 26 and 24. Rotation of the double gear 18 rotates the gears 22 which, in turn, actuate the gears 15 through the gear 23. The shafts 13 are thus rotated in their bearings 12 for adjusting the pitch of the propeller blades 8 through the worm gears 14 and 11. As the hub 5 rotates it, of course, carries with it the gear 16 which gear 16, in turn, actuates the gears 21, said gears 21 rolling or traveling around the stationary gear 17, carrying with them the shafts 20 and the plate 19. Thus, the gears 22 are caused to roll around the double gear 18, carrying with them the gear 23 which, as hereinbefore stated, is also in mesh with the gears 15 on the shafts 13. The gear 23 turns at the same speed as the gear 16 (and hub 5 and the teeth of 15) as long as 18 is held against movement with respect to 17 and 1. In this manner the adjustment of the blades 8 is retained. The rear end portion of the shaft 25 is journaled in a bearing 31 having mounted thereon a set screw 32 for locking said shaft and the gears 26, 24 and 18 against rotation after the desired adjustment of the blades 8 have been made.

It is believed that the many advantages of a variable pitch propeller constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

In conclusion it seems proper to specifically mention that the worm drive is not an absolutely essential expedient. That is to say some other mechanical equivalent propulsion means may be substituted therefor, it being thought that such change will fall within the purview of the inventive concepts as defined by the subjoined claims.

What is claimed is:

1. In combination, an engine crank case, a crank shaft operable in said crank case and projecting therefrom, a tubular housing for the crank shaft mounted on the crank case, a double gear rotatably mounted on the tubular housing, a stationary gear fixed on the tubular housing, a plate rotatably mounted on the tubular housing between the double and stationary gears, stub shafts mounted in said plate, a hub fixed on the crank shaft, blades mounted for rotary adjustment on said hub, an internally toothed annular gear on said hub, gears loosely mounted on end portions of the stub shafts and engaged with the stationary gear and said annular gear, gears rotatably mounted on the other end portions of the stub shafts and engaged with one end portion of the double gear, an internally and externally toothed annular gear operatively engaged with the fifth named gears, shafts rotatably mounted on the hub, gears on the hub-mounted shafts operatively engaged with the external teeth of the second named annular gear, worm gears operatively connecting the hub-mounted shafts to the blades for rotatably adjusting said blades, and means for manually actuating the double gear for adjusting the blades.

2. In combination, an engine crank case, a crank shaft operable in said crank case and projecting therefrom, a tubular housing for the crank shaft mounted on the crank case, a double gear rotatably mounted on the tubular housing, a stationary gear fixed on the tubular housing, a plate rotatably mounted on the tubular housing between the double and stationary gears, stub shafts mounted in said plate, a hub fixed on the crank shaft, blades mounted for rotary adjustment on said hub, an internally toothed annular gear on said hub, gears loosely mounted on end portions of the stub shafts and engaged with the stationary gear and said annular gear, gears rotatably mounted on the other end portions of the stub shafts and engaged with one end portion of the double gear, an internally and externally toothed annular gear operatively engaged with the fifth named gears, shafts rotatably mounted on the hub, gears on the hub-mounted shafts operatively engaged with the external teeth of the second named annular gear, worm gears operatively connecting the hub-mounted shafts to the blades for rotatably adjusting said blades, and means for manually actuating the double gear for adjusting the blades, said means including a shaft, a hand crank on one end portion of the last named shaft, a gear on the other end portion of said last named shaft, and a gear operatively connecting the last named gear to one end portion of the double gear.

OBY BONAWIT.